United States Patent [19]

Lofe et al.

[11] Patent Number: 5,137,771
[45] Date of Patent: Aug. 11, 1992

[54] PERFLUOROELASTOMER SEAL

[75] Inventors: Thomas F. Lofe, Newark; Phillip J. Politza, Claymont, both of Del.

[73] Assignee: E. I. Du Pont de Nemours and Company, Wilmington, Del.

[21] Appl. No.: 422,504

[22] Filed: Oct. 17, 1989

[51] Int. Cl.⁵ .................. B32B 27/00; B32B 27/32
[52] U.S. Cl. .................. 428/192; 428/421; 428/422
[58] Field of Search .......... 526/206, 247; 525/369; 428/422, 192, 421

[56] References Cited

U.S. PATENT DOCUMENTS 4,035,565  7/1977  Apotheker et al. ........... 525/369 X
4,499,249  2/1985  Nakagawa et al. ............ 526/206

OTHER PUBLICATIONS

Du Pont Trade Publication, In Chemical Transportation: Kalrez® O-Rings Seal in Valve Dependability Attachment 4B Kalrez® Perfluoroelastomer Parts.

Primary Examiner—Thomas J. Herbert, Jr.
Attorney, Agent, or Firm—Donald W. Huntley

[57] ABSTRACT

A mating seal having a sealing surface of perfluoroelastomer in the form of a ring having a flange on at least the outer edge of the ring and a mechanically anchored retaining plate positioned radially inward from the flange on the outer edge of the ring.

6 Claims, 2 Drawing Sheets

PERFLUOROELASTOMER SEAL

BACKGROUND OF THE INVENTION

A wide variety of sealing means have previously been provided for valves. In those valves designed for corrosive and toxic chemicals, such as those found in tank trailers, the design parameters are particularly stringent, since even minor leakage should be avoided. A number of such aggressive chemicals are now pumped under pressure into tanks from the bottom, in order to prevent escape of emissions from a top loading port on a tank. Such procedures, however, further complicate the stresses on the valves, since bottom loading significantly increases the pressures to which the valve sealing surfaces are exposed, and subjects the valves to stresses for which they were not originally designed.

SUMMARY OF THE INVENTION

The present invention provides a sealing means which provides excellent long-term performance in high-stress environments with corrosive fluids.

Specifically, the instant invention provides, in a mating seal having first and second substantially annular opposing sealing surfaces in which one surface is at least partially made up of fluoropolymer which forms a seal between the surfaces, the improvement wherein the fluoropolymer is a perfluoroelastomer ring having at least one face substantially parallel to at least one of the sealing surfaces, the ring having a flange on at least the outer edge of the ring extending substantially perpendicularly from the first sealing surface, and a retaining plate positioned radially inward from the flange on the outer edge of the ring, the retaining plate being mechanically anchored to the first sealing surface, and wherein at least the flange on the outer edge of the ring extends to at least the surface of the retaining plate.

DETAILED DESCRIPTION OF THE INVENTION

The invention will be more fully understood by reference to the Figures.

Figure 1:
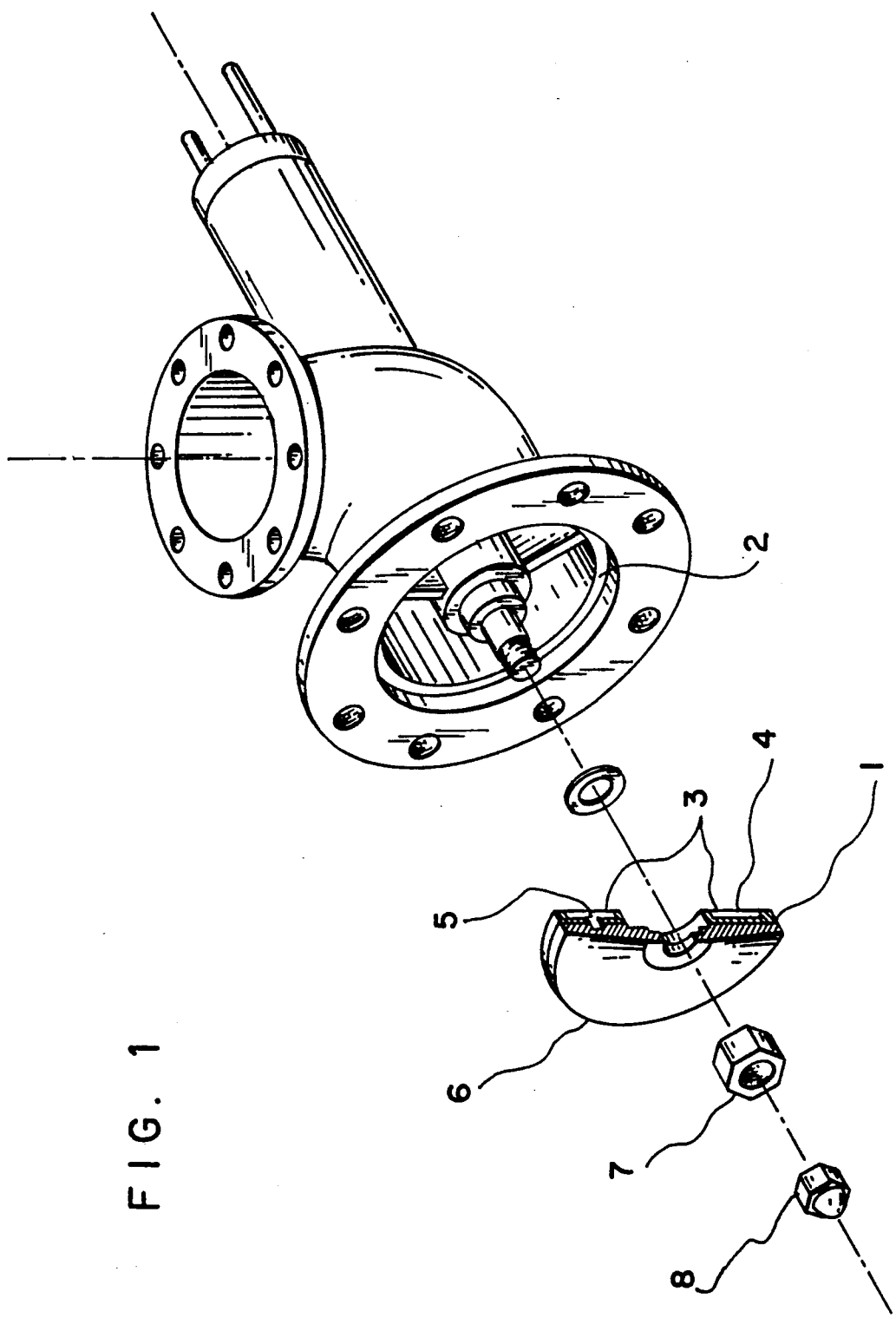
FIG. 1 is an exploded view of a valve sealing assembly of the present invention.

FIG. 1 is an exploded view of a valve assembly having a mating seal of the present invention in which first and second opposing sealing surfaces 1 and 2, in the closed configuration of the valve, are brought together to form a seal. The first surface is partially made up of perfluoroelastomer element 3, which is the shape of a ring. The ring is held in place by a retaining plate 4 positioned radially inward from a flange on the outer edge of the ring. The retaining plate is mechanically anchored to the first sealing surface by screws 5, which are fixed in cap 6. In this preferred embodiment, the retaining plate is anchored through the perfluoroelastomer ring. The cap, in turn, is held in place by hex spacer 7 and acorn nut 8.

Figure 2:
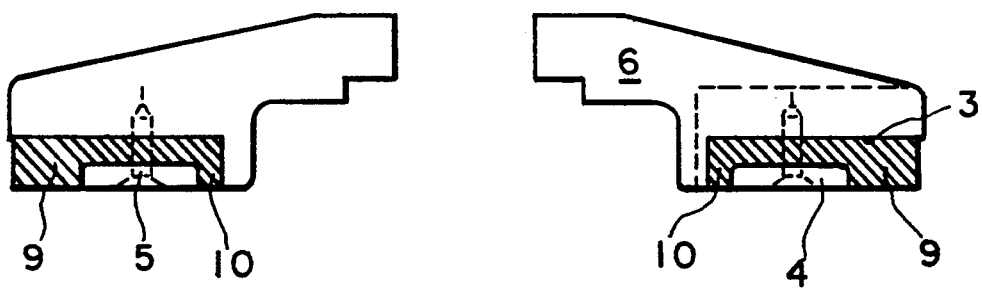
FIG. 2 is a cross-sectional view of a cap of the assembly of FIG. 1.

The perfluoroelastomer element is better seen in FIG. 2, which is a cross-sectional view of a cap of the assembly of FIG. 1. In that Figure, the perfluoroelastomer ring 3 has a flange 9 on the outer edge of the ring, which extends at least to the surface of the retaining plate 4. The perfluoroelastomer rings used in the present invention prefereably also have a flange on the inner edge of the ring, here shown as element 10, which extends substantially perpendicularly from the first sealing surface, and, in this embodiment, extends to the surface of the sealing element.

Figure 3:
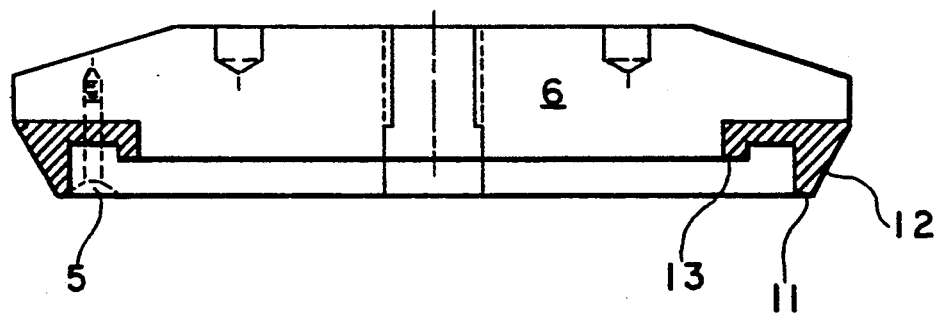
FIG. 3 is a cross-sectional view of a cap of the general type shown in FIG. 2, showing an alternative embodiment of the invention.

Still another embodiment of the invention is shown in FIG. 3, which is a cross-sectional view of a cap of the general type shown in FIG. 2. In this Figure, flange 11, on the outer edge of the perfluoroelastomer ring, provides the sealing function at surface 12, which is substantially parallel to opposing sealing surface 2. Flange 13, on the inner edge of the ring, does not extend to the surface of the retaining plate, but nonetheless stabilizes the seal against the pressures encountered in bottom loading operations for a valve.

A wide variety of perfluoroelastomers can be used in the practice of this invention including, for example, those prepared as copolymers of tetrafluoroethylene, a perfluoroalkyl perfluorovinyl ether and, typically, a cure site monomer. Representative perfluoroelastomers of this type are described in Finlay, U.S. Pat. No. 4,529,784 and Apotheker, U.S. Pat. No. 4,035,565, and Nakagawa et al., U.S. Pat. No. 4,499,249, each hereby incorporated by reference. Such perfluoroelastomers are commercially available from E. I. du Pont de Nemours and Company as Kalrez perfluoroelastomers. Other compositions of this general type which can be used are those commercially available from Greene, Tweed & Co. as Chemraz perfluoroelastomer.

The seals of the present invention provide outstanding performance in high pressure environments involving chemically aggressive fluids. This is due to the combination of the perfluoroelastomeric material specified in the present invention, its configuration, and the mechanical attachment to the mating surface. The perfluoroelastomer provides a compressible, non-degradable sealing surface against the valve face. The elastomeric nature of the material permits the retention of a positive sealing force despite the presence of abrasive particulates.

The stucture of the perfluoroelastomer, having a flange on both the outer and inner edge, is important to its overall performance. The outer flange provides the primary sealing surface. The inner flange, if it extends to the surface of the retaining plate, can aid in the sealing function, and, in any case, aids in stabilizing the seal, even under unusually high pressures.

It is particularly surprising that the sealing structures as herein defined function satisfactorily. Perfluoroelastomers are typically used as simple shapes such as o-rings, and it is unusual to use perfluoroelastomers in a complex shape such as that presently required, having a flange on a ring outside of the retaining plate, and preferably on the inside edge of the ring as well.

Previously available valves of this type had a sealing surface with an o-ring of perfluoroelastomer, which were considered to provide the best sealing performance that could be attained. However, the present seals, having the perimetral flange and mechanical attachment, not only exhibit the resistance to aggressive chemicals which is characteristic of perfluoroelastomers, but have outstanding long-term resistance to the high pressures found with bottom-loading operations in tank trucks.

We claim:

1. In a mating seal having first and second annular opposing sealing surfaces in which one surface is at least partially made up of fluoropolymer which forms a seal between the surfaces, the improvement wherein the fluoropolymer is a perfluoroelastomer ring having at least one face parallel to at least one of the sealing surfaces, the ring having a flange on at least the outer edge of the ring extending substantially perpendicularly from the the ring, and a retaining plate positioned radially inward from the flange on the outer edge of the ring, the retaining plate being mechanically anchored through the ring, and wherein at least the flange on the outer edge of the ring extends to at least the surface of the retaining plate.

2. A seal of claim 1 wherein the ring further comprises a flange on the inner edge of the ring.

3. A seal of claim 1 wherein the perfluoroelastomer consists essentially of a copolymer comprising tetrafluoroethylene and perfluoroalkyl perfluorovinyl ether.

4. A seal of claim 3 wherein the perfluoroelastomer further comprises polymerized ethylene monomer.

5. A seal of claim 3 wherein the perfluoroelastomer further comprises at least one cure site monomer.

6. A seal of claim 5 wherein the perfluoroalkyl perfluorovinyl ether consists essentially of perfluoromethyl perfluorovinyl ether.

* * * * *